(12) United States Patent
Hamilton et al.

(10) Patent No.: US 7,783,611 B1
(45) Date of Patent: Aug. 24, 2010

(54) SYSTEM AND METHOD FOR MANAGING FILE METADATA DURING CONSISTENCY POINTS

(75) Inventors: Eric Hamilton, Durham, NC (US);
Jeffrey S. Kimmel, Chapel Hill, NC (US); Robert L. Fair, Cary, NC (US); Ashish Prakash, Morrisville, NC (US)

(73) Assignee: NetApp, Inc., Sunnyvale, CA (US)

( * ) Notice: Subject to any disclaimer, the term of this patent is extended or adjusted under 35 U.S.C. 154(b) by 528 days.

(21) Appl. No.: 10/705,025

(22) Filed: Nov. 10, 2003

(51) Int. Cl.
*G06F 17/30* (2006.01)
*G06F 17/40* (2006.01)
(52) U.S. Cl. .................. 707/690; 707/696; 707/703
(58) Field of Classification Search ............... 707/1–10, 707/100–104.1
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,570,217 A | 2/1986 | Allen et al. | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,843,541 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,916,608 A | 4/1990 | Shultz | |
| 4,989,206 A | 1/1991 | Dunphy, Jr. et al. | |
| 5,124,987 A | 6/1992 | Milligan et al. | |
| 5,129,088 A | 7/1992 | Auslander et al. | |
| RE34,100 E | 10/1992 | Hartness | |
| 5,155,835 A | 10/1992 | Belsan | |
| 5,163,131 A | 11/1992 | Row et al. | |
| 5,202,979 A | 4/1993 | Hillis et al. | |
| 5,218,695 A * | 6/1993 | Noveck et al. | ............... 707/205 |
| 5,278,979 A | 1/1994 | Foster et al. | |
| 5,355,453 A | 10/1994 | Row et al. | |
| 5,426,747 A | 6/1995 | Weinreb et al. | |
| 5,485,579 A | 1/1996 | Hitz et al. | |

(Continued)

FOREIGN PATENT DOCUMENTS

WO    WO 89/10594    11/1989

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner*—Cheyne D Ly
*Assistant Examiner*—Sangwoo Ahn
(74) *Attorney, Agent, or Firm*—Cesari and McKenna, LLP

(57) ABSTRACT

A system and method for enabling write operations to files undergoing write allocation is provided. The system and method generate a shadow state entry of metadata associated with an inode of the file upon receipt of a write operation. During the write allocation process for the inode, the shadow state information is merged with the data stored in the inode to be written to disk.

55 Claims, 8 Drawing Sheets

U.S. PATENT DOCUMENTS

| | | | |
|---|---|---|---|
| 5,511,177 | A | 4/1996 | Kagimasa et al. |
| 5,581,724 | A | 12/1996 | Belsan et al. |
| 5,764,972 | A | 6/1998 | Crouse et al. |
| 5,802,366 | A | 9/1998 | Row et al. |
| 5,819,292 | A * | 10/1998 | Hitz et al. .................. 707/203 |
| 5,828,876 | A | 10/1998 | Fish et al. |
| 5,870,734 | A | 2/1999 | Kao |
| 5,897,661 | A | 4/1999 | Baranovsky et al. |
| 5,907,672 | A | 5/1999 | Matze et al. |
| 5,918,229 | A | 6/1999 | Davis et al. |
| 5,931,918 | A | 8/1999 | Row et al. |
| 5,941,972 | A | 8/1999 | Hoese et al. |
| 5,944,789 | A | 8/1999 | Tzelnic et al. |
| 5,963,962 | A | 10/1999 | Hitz et al. |
| 5,987,477 | A | 11/1999 | Schmuck et al. |
| 5,996,047 | A * | 11/1999 | Peacock .................... 711/118 |
| 6,038,570 | A | 3/2000 | Hitz et al. |
| 6,065,037 | A | 5/2000 | Hitz et al. |
| 6,173,293 | B1 | 1/2001 | Thekkath et al. |
| 6,173,374 | B1 | 1/2001 | Heil et al. |
| 6,185,655 | B1 | 2/2001 | Peping |
| 6,275,898 | B1 | 8/2001 | DeKoning |
| 6,397,311 | B1 | 5/2002 | Capps et al. |
| 6,425,035 | B2 | 7/2002 | Hoese et al. |
| 6,453,354 | B1 * | 9/2002 | Jiang et al. .................. 709/229 |
| 6,526,478 | B1 | 2/2003 | Kirby |
| 6,571,189 | B2 | 5/2003 | Capps et al. |
| 6,606,690 | B2 | 8/2003 | Padovano |
| 6,618,798 | B1 | 9/2003 | Burton et al. |
| 6,636,879 | B1 | 10/2003 | Doucette et al. |
| 6,643,654 | B1 | 11/2003 | Patel et al. |
| 6,748,504 | B2 * | 6/2004 | Sawdon et al. .............. 711/162 |
| 6,983,296 | B1 | 1/2006 | Muhlestein et al. |
| 2002/0112022 | A1 | 8/2002 | Kazar et al. |
| 2002/0116593 | A1 | 8/2002 | Kazar et al. |
| 2005/0066095 | A1 * | 3/2005 | Mullick et al. .............. 710/200 |
| 2005/0097142 | A1 * | 5/2005 | Best et al. .................... 707/200 |

OTHER PUBLICATIONS

Bitton, Dina, *Disk Shadowing*, Proceedings of the 14th VLDB Conference, LA, CA 1988.
Chaudhuri, Surajit, et al., *Self-Tuning Technology in Microsoft SQL Server*, Data Engineering Journal 22, Feb. 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.
Hecht, Matthew S., et al. *Shadowed Management of Free Disk Pages with a Linked List*, ACM Transactions on Database Systems, 8/4, Dec. 1983, pp. 503-514.
Howard, John, H. et al., *Scale and Performance in a Distributed File System*, Carnegie Mellon University, CMU-ITC-87-068, Aug. 1987.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael Leon, *Synchronization and Caching Issues in the Andrew File System*, Carnegie Mellon University, CMU-ITC-88-063.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, Feb. 1999 pp. 33-40.
Kent, Jack et al., *Optimizing Shadow Recovery Algorithms*, IEEE Transactions on Software Engineering, 14( 2): 155-168 , Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. *Physical Integrity in a Large Segmented Database*, ACM Trans. Database Syst., vol. 2, Mar. 1977, pp. 91-104.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.
Rosenblum, Mendel, et al. *The Design and Implementation of a Log-Structured File System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementation of a Log-Structured File System*, In Proceedings of ACM Transactions on Computer Systems, (10)1:26-52, Feb. 1992.
Schiefer, Berni, et al., *DB2 Universal Database Performance Tuning*, Data Engineering Journal 22, Feb. 1999 pp. 12-19.
Seltzer, Margo I., et al., *Journaling Versus Soft Updates: Asynchronous Meta-Data Protection in File Systems*, Proceedings of 200 USENIX Annual Technical Conference, Jun. 18-23, 2000.
Shasha, Dennis, *Tuning Time Series Queries in Finance: Case Studies and Recommendations*, Data Engineering Journal 22, Feb. 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, Feb. 1999 pp. 28-32.
Weikum, Gerhard, et al., *Towards Self-Tuning Memory Management for Data Servers*, Data Engineering Journal 22, Feb. 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Administration Guide found at http://www.openafs.org/pages/doc/AdminGuide/auagd010.htm visited on Mar. 2, 2005.
Basilico, et al., *Error Correction System Using "Shadow Memory,"* IBM Technical Disclosure Bulletin, May 1984, pp. 5792-5793.
Bitton, Dina, *Disk Shadowing*, Proceedings of the 14th VLDB Conference, LA, CA (1988).
Blasgen, M.W. et al., *System R:An architectural Overview*, Reprinted from IBM Systems Journal vol. 20, No. 1, 1981 © 1981, 1999.
Borenstein, Nathaniel S., *CMU's Andrew project a retrospective*, Communications of ACM, (39)12, Dec. 1996.
Brown, Mark R. et al., *The Alpine file system*, ACM Transactions on Computing Systems, 3(4):261-293, Nov. 1985.
Chen, Peter M., et al., *An Evaluation of Redundant Arrays of Disks Using an Amdahl 5890* Performance Evaluation, pp. 74-85, 1990.
Chutani, Sailesh, et al., *The Episode file system*, In Proceedings of the USENIX Winter 1992.

Clark, B.E., et al., *Application System/400 Performance Characteristics*, IBM Systems Journal, 28(3): 407-423, 1989.

Data Sheet for the Check Point Software Technologies product Flood-Gate-1 (1997).

Dibble, Peter C., et al., *Beyond Striping: The Bridge Multiprocessor File System*, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?(article I have has no date or cite).

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-215.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1: 91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12$^{th}$ IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on the Sprite Network Operating System*, found at http://www.cs.berkeley.edu/projects/sprite/retrospective.html.visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*. In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al, The *Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al, *Deciding When to Forget in the Elephant File System*, Operating Systems Review, 34(5), (Dec. 1999) pp. 110-123.

Satyanarayanan, M., et al., *The ITC Distributed File System: Principles and Design*, In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

Pawlowski, et al., U.S. Appl. No. 10/215,917, filed Aug. 9, 2002, titled Multi-Protocol Storage Appliance That Provides Integrated Support for File and Block Access Protocols.

Edwards, et al., U.S. Appl. No. 10/027,634, filed Dec. 21, 2001, titled File System Defragmentation Technique Via Write Allocation.

Hamilton, et al., U.S. Appl. No. 10/705,025, filed Nov. 10, 2003, titled System and Method for Managing File Metadata During Consistency Points.

Fair, et al., U.S. Appl. No. 10/705,470, titled Method for Detecting Leaked Buffer Writes Across File System Consistency Points.

David Hitz et al., TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al., (1999) Request for Comments (RFC) 2616, HTTP/1.1.

Auspex Systems, LFS—A Local File System for Multiprocessor NFS Network Servers, 1994.

Unix Workstation System Administration Education Certification Course, Jan. 8, 2002.

Ron Lenive and Michelle Gervais, Building a SAN, SunExpert Magazine, Mar. 1999, pp. 50-64.

Network Appliance ends NAS-SAN war by Computerwire, http://www.theregister.co.uk/2002/10/102/network_appliance_ends_nassan_war/print.html, Published Wednesday, Oct. 2, 2002.

International Search Report PCT/US03/23597, Mar. 9, 2004, 7 pages, International Searching Authority, Alexandria, Virginia, USA.

International Search Report PCT/US03/23597, Apr. 14, 2004, 8 pages, International Searching Authority, Alexandria, Virginia, USA.

Lu, Y. "Performance Study of iSCSI -Based Storage Subsystems", IEEE Communications Magazine, pp. 76-82, Aug. 2003.

Celerra File Server Architecture for High Availability, EMC2 where information lives, Aug. 1999, pp. 1-7.

Callaghan B. "NFS Version 3 Protocol Specification", Request for Comments (RFC) 1813 Jun. 1995.

Asante Desktop EN/SC Adapters User's Manual Apr. 1996.

Asante EN/SC Adapter Family Installation Guide May 1994.

Maintenance Procedures ND (8C) nd-network disk control Feb. 1985.

Misc. Reference Manual Pages ND (4P) nd-network disk driver Jul. 26, 1985.

Performance Without Compromise: The Virtual Storage Architecture 1997.

* cited by examiner

| PERMISSIONS | 605 |
|---|---|
| SIZE OF FILE | 610 |
| NUMBER OF BLOCKS | 615 |
| TIME MODIFIED | 620 |
| TIME ATTRIBUTES CHANGED | 625 |
| PROGRESS INDICATOR | 630 |
| FLAGS | 635 |

600

FIG. 6

SYSTEM AND METHOD FOR MANAGING FILE METADATA DURING CONSISTENCY POINTS

FIELD OF THE INVENTION

The present invention relates to file systems and, more specifically, to tracking metadata associated with files in a file system.

BACKGROUND OF THE INVENTION

A storage system is a computer that provides storage service relating to the organization of information on writable persistent storage devices, such as memories, tapes or disks. The storage system is commonly deployed within a storage area network (SAN) to or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the to network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A common type of file system is a "write in-place" file system, an example of which is the conventional Berkeley fast file system. In a write in-place file system, the locations of the data structures, such as inodes and data blocks, on disk are typically fixed. An inode is a data structure used to store information, such as metadata, about a file, whereas the data blocks are structures used to store the actual data for the file. The information contained in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Changes to the inodes and data blocks are made "in-place" in accordance with the write in-place file system. If an update to a file extends the quantity of data for the file, an additional data block is allocated and the appropriate inode is updated to reference that data block.

Another type of file system is a write-anywhere file system that does not over-write data on disks. If a data block on disk is retrieved (read) from disk into memory and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. A particular example of a write-anywhere file system that is configured to operate on a storage appliance is the Write Anywhere File Layout (WAFL™) file system available from Network Appliance, Inc. of Sunnyvale, Calif. The WAFL file system is implemented within a microkernel as part of the overall protocol stack of the filer and associated disk storage. This microkernel is supplied as part of Network Appliance's Data ONTAP™ storage operating system, residing on the filer, that processes file-service requests from network-attached clients.

As used herein, the term "storage operating system" generally refers to the computer-executable code operable on a storage system manages data access and may, in case of a filer, implement file system semantics, such as the Data ONTAP™ storage operating system, implemented as a microkernel, and available from Network Appliance, Inc., of Sunnyvale, Calif., which implements a Write Anywhere File Layout (WAFL™) file system. The storage operating system can also be implemented as an application program operating over a general-purpose operating system, such as UNIX® or Windows NT®, or as a general-purpose operating system with configurable functionality, which is configured for storage applications as described herein.

Disk storage is typically implemented as one or more storage "volumes" that comprise physical storage disks, defining an overall logical arrangement of storage space. Currently available storage system (filer) implementations can serve a large number of discrete volumes (150 or more, for example). Each volume is associated with its own file system and, for purposes hereof, volume and file system shall generally be used synonymously. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate caching of parity information with respect to the striped data. In the example of a WAFL-based file system, a RAID 4 implementation is advantageously employed. This implementation specifically entails the striping of data across a group of disks, and separate parity caching within a selected disk of the RAID group. As described herein, a volume typically comprises at least one data disk and one associated parity disk (or possibly data/parity partitions in a single disk) arranged according to a RAID 4, or equivalent high-reliability, implementation.

A consistency point (CP) is a wholly consistent and up-to-date version of the file system that is typically written to disk or to other persistent storage media. In a system utilizing CPs, a CP of the file system is created typically at regular time intervals. Thus, in the event of an error condition, only data written to files after the last CP occurred are lost or corrupted. If a journaling file system is utilized where write operations are logged before being committed to disk, the stored operations can be replayed to restore the file system "up to date" after a crash other error condition. In the example of a WAFL-based journaling file system, these CPs ensure that no data is lost in the event of a storage system crash or other error condition. CPs are further described in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which is hereby incorporated by reference.

In a CP-based file system, the on-disk copy of the file system is usually slightly "out of date" compared to the instantaneous state of the file system that is stored in memory of a storage system. During a CP, the file system identifies all data that must appear in the CP and writes it to disk. Once this write operation completes, the on-disk copy of the file system reflects the state of the file system as of the CP. However, the time required to identify the data that must be written to disk in a given CP and to perform the actual write operation typically takes much longer than the time required for an individual file system operation to complete. Thus, a file system utilizing CPs typically halts or otherwise suspends write operations during the time required to perform write allocation during the CP. Under heavy loads involving large files, this time may be on the order of tens of seconds, which seriously impedes data latency for clients of the storage system. For example, a client will not receive an acknowledgement of a write request until such time as the CP has been completed, thus causing some application programs executing on the client to generate error messages or suffer failure conditions due to timeout conditions.

Additionally, system performance may be impaired due to a large number of write operations that may be queued and suspended while the CP write allocation operation is performed, such as, for example, when a database issues many write operations to a single file. If these writes are queued, the database system may suffer reduced performance due to the increased latency of write operations. If write operations are accepted during an ongoing CP, the storage system must be able to identify and differentiate incoming data and metadata associated with a modified file as well as the CP that the modified data is related thereto. For example, if a file is currently undergoing write allocation and an incoming write operation is received, the storage system must separate and differentiate the newly received data from the data currently being write allocated. If the storage system fails to differentiate properly between the two types of data and metadata, the file system, and more specifically, the file undergoing write allocation, may lose consistency and coherency, with an accompanying loss of data or an inability to access the stored data.

SUMMARY OF THE INVENTION

The disadvantages of the prior art are overcome by providing a system and method for managing metadata during consistency points (CPs) to thereby enable performance of write operations directed to a file currently involved in a CP. According to the illustrative embodiment, when a write request is received by a storage system for a file that is currently being write allocated during a CP, a file system creates a shadow data structure in memory (in-core) of the storage system to store the metadata associated with the file. During a write allocation phase of the current CP, the metadata stored in the shadow data structure is committed (written) to disk. Any subsequently received metadata is stored in an in-core inode of the file; this newly received metadata will be written to disk during a next CP.

Further to the illustrative embodiment, a shadow index is maintained within the in-core inode structure of the file, wherein the shadow index contains a pointer to the shadow data structure storing the metadata associated with the file. When initiating write allocation of the inode for the file, a write allocation process of the file system utilizes the index pointer to locate the shadow data structure. According to the invention, the in-core inode structure is copied to a buffer of the memory. The shadow data (stored in the shadow data structure) is then "merged" onto the buffered copy of the inode, thereby overwriting certain data for the next CP with the shadow data for the current CP. The modified buffered inode is thereafter written to disk to complete the write allocation phase.

As a result, the data written to the in-core inode is utilized for the next CP. By employing the novel shadow data structures, a storage operating system of a storage system may continue to process write operations directed to files, even while the file is undergoing write allocation during a CP. This aspect of the invention substantially improves system performance and eliminates long latency for certain data access requests.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 6 is a schematic block diagram of an exemplary shadow data structure in accordance with an embodiment of the present invention;

DETAILED DESCRIPTION OF AN ILLUSTRATIVE EMBODIMENT

A. Storage Appliance

When used in a SAN environment, a storage system may be embodied as a multi-protocol storage appliance having a storage operating system that implements a file system and provides for storage virtualization and support for virtual disks (vdisks). An example of a multi-protocol storage appliance that may be advantageously used with the present invention is described in co-pending and commonly assigned U.S. patent application Ser. No. 10/215,917 entitled A MULTI-PROTOCOL STORAGE APPLIANCE THAT PROVIDES INTEGRATED SUPPORT FOR FILE AND BLOCK ACCESS PROTOCOLS, by Brian Pawlowski, et al., published on Feb. 12, 2004 as U.S. Patent Publication No. 2004/0030668 A1, which is hereby incorporated by reference as though fully set forth herein.

Figure 1:
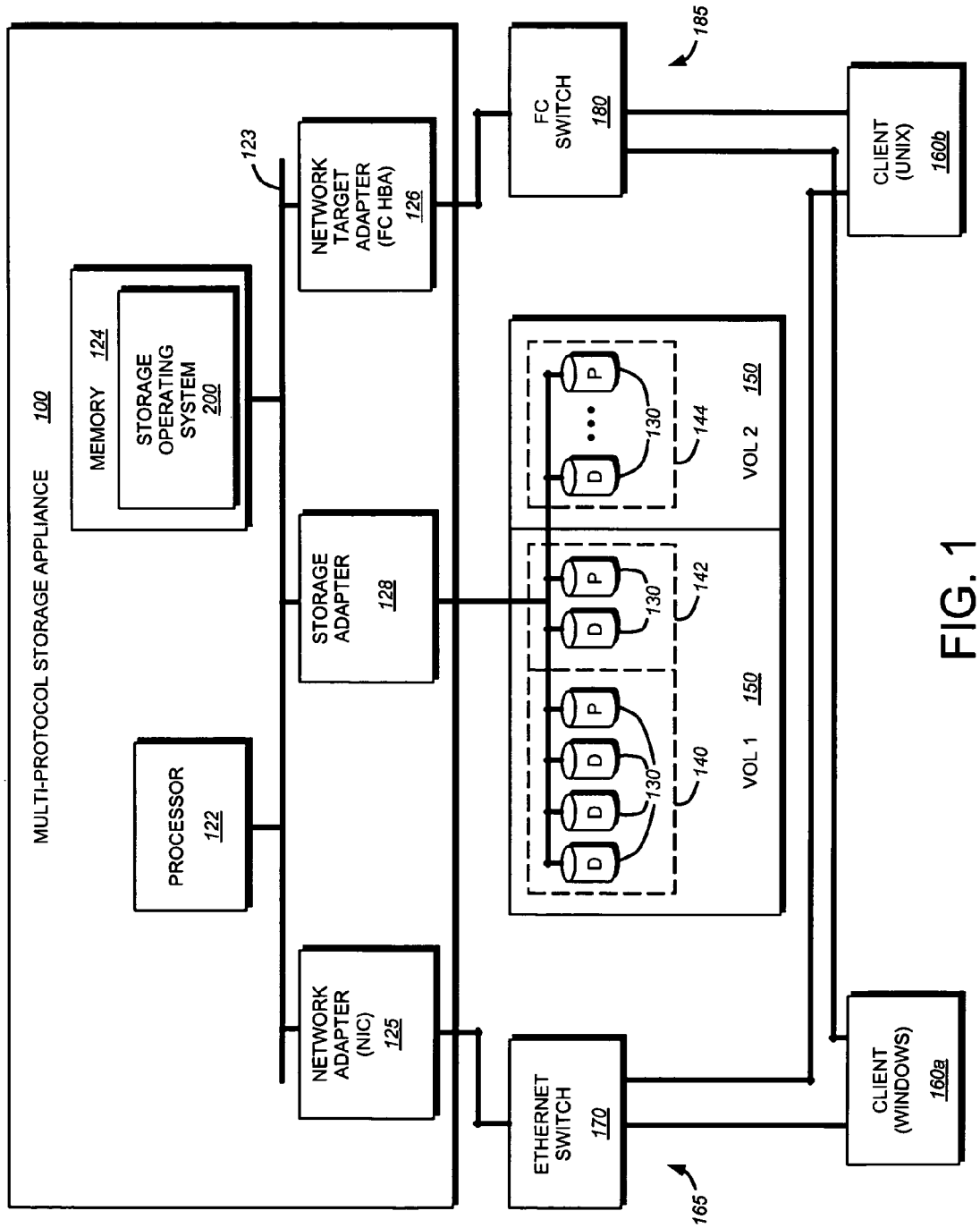
FIG. 1 is a schematic block diagram of an exemplary storage system network in accordance with an embodiment of the present invention.

FIG. 1 is a schematic block diagram of an illustrative storage appliance 100 that may be advantageously used with the present invention. The storage appliance is configured to provide storage service for both file and block protocol access to information stored on storage devices in an integrated manner. In this context, the storage appliance, denotes a computer having features such as simplicity of storage service management and ease of storage reconfiguration, including reusable storage space, for users (system administrators) and clients of network attached storage (NAS) and storage area network (SAN) deployments.

The multi-protocol storage appliance 100 is illustratively embodied as a storage to system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

The clients of a SAN-based network environment have a storage viewpoint of blocks or disks. To that end, the multi-protocol storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the invention described herein.

The network adapter 125 couples the storage appliance to a plurality of clients 160$a,b$ over point-to-point links, wide area networks, virtual private networks implemented over a public network (Internet) or a shared local area network, hereinafter referred to as an illustrative Ethernet network 165. For this NAS-based network environment, the clients are configured to access information stored on the multi-protocol appliance as files. Therefore, the network adapter 125 may comprise a network interface card (NIC) having the mechanical, electrical and signaling circuitry needed to connect the appliance to a network switch, such as a conventional Ethernet switch 170. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over an NAS-based network. Therefore, each client 160 may request the services of the storage appliance 500 by issuing file access protocol messages (in the form of packets) to the appliance over the network 165. For example, a client 160$a$ running the Windows operating system may communicate with the storage appliance 100 using the Common Internet File System (CIFS) protocol over TCP/IP. On the other hand, a client 160$b$ running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 500 to a SAN network switch, such as a conventional FC switch 180. In addition to providing FC access, the FC HBA offloads fiber channel network processing operations for the to storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 100 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. However, other RAID level configurations (e.g. RAID 5) are also contemplated. In the illustrative embodiment, a minimum of one parity disk and one data disk may be employed. However, a typical implementation may include three data and one parity disk per RAID group and at least one RAID group per volume.

Within each volume may be stored one or more virtual disks (vdisks). A vdisk is a special file type in a volume that derives from a plain (regular) file, but that has associated export controls and operation restrictions that support emulation of a disk. In the illustrative embodiment, a vdisk is a multi-inode object comprising a special file inode and a set of stream inodes that are managed as a single, encapsulated storage object within a file system of a storage system. As used herein, a set of stream inodes shall be meant as one or more stream inodes. The vdisk illustratively manifests as an embodiment of a stream inode that, in cooperation with the special file inode, creates a new type of file storage object having the capacity to encapsulate specific security, management and addressing (export) information. A vdisk is, thus, an encapsulated data container comprising a data section and one or more metadata sections that may be stored in streams associated with the data section within the file system. An example of a stream inode object that may be advantageously used with the present invention is described in U.S. patent application Ser. No. 09/891,195 titled SYSTEM AND METHOD FOR REPRESENTING NAMED DATA STREAMS WITHIN AN ON-DISK STRUCTURE OF A FILE SYSTEM, by Kayuri Patel et al., now issued as U.S. Pat. No. 6,446,653 on Sep. 10, 2002, which is hereby incorporated by reference as though fully set forth herein.

B. Storage Operating System

To facilitate access to the disks 130, the storage operating system 200 implements a write-anywhere file system that cooperates with virtualization modules to provide a function that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein. The term "metadata" refers to data that is generated, stored and managed by the storage operating system, and its associated file system layer, to maintain the structure and organization of the file system. Metadata can include, for example, security attributes associated with files or data containers. As the storage operating system and its associated file system generate metadata, it is referred to herein as "internally generated data." Conversely, all other data stored by the file system, including, for example, data generated by network clients and/or other processes in the storage operating system is referred to as "externally generated data."

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
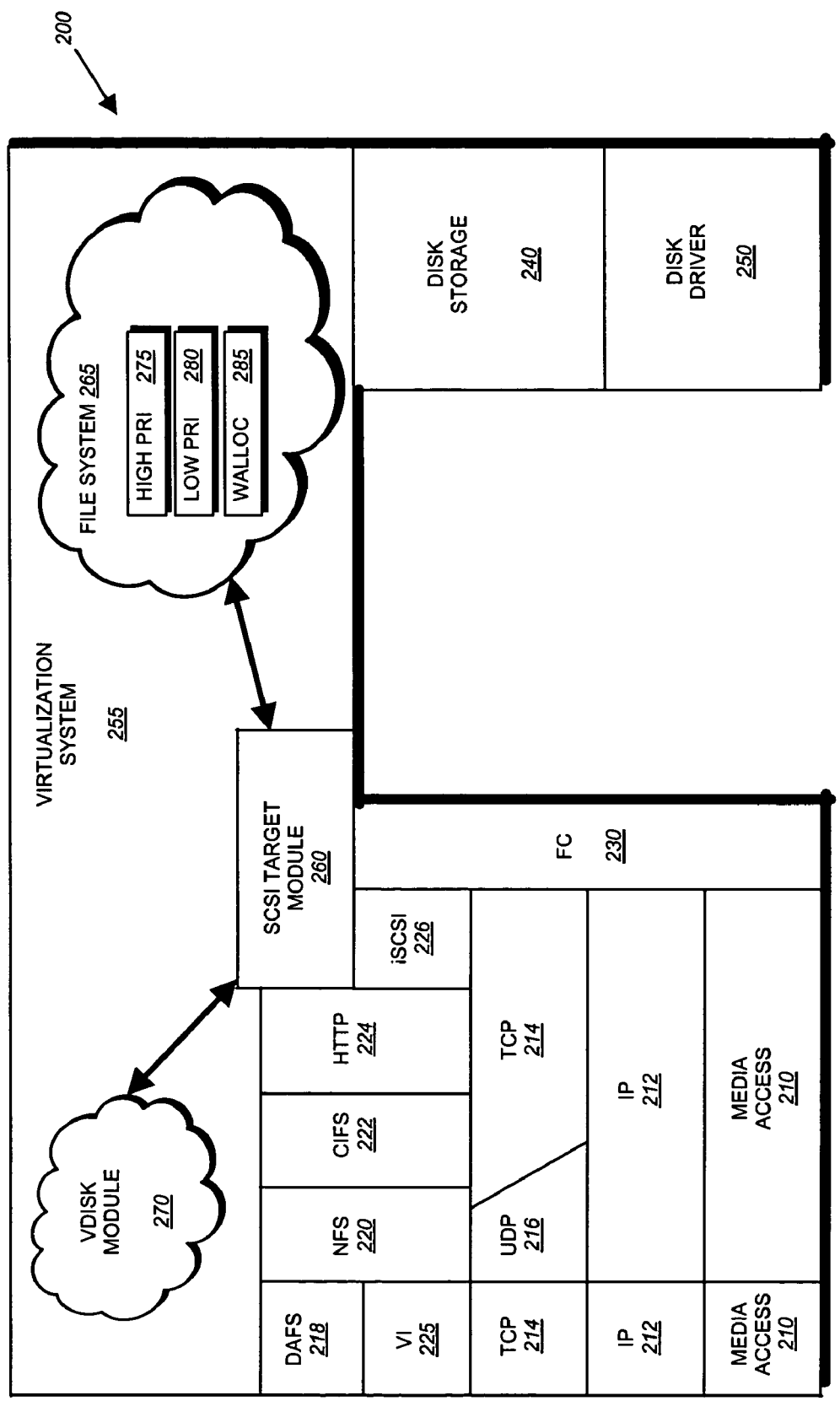
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 226 provides block protocol access over the TCP/IP network protocol layers, while a FC driver layer 230 operates with the FC HBA 226 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255 that is implemented by a file system 265 interacting with virtualization modules illustratively embodied as, e.g., vdisk module 270 and SCSI target module 260. It should be noted that the vdisk module 270, the file system 265 and SCSI target module 260 can be implemented in software, hardware, firmware, or a combination thereof. The vdisk module 270 interacts with the file system 265 to enable access by administrative interfaces in response to a system administrator issuing commands to the multi-protocol storage appliance 100. In essence, the vdisk module 270 manages SAN deployments by, among other things, implementing a comprehensive set of vdisk (lun) commands issued through a user interface by a system administrator. These vdisk commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates luns into the special vdisk file types. The SCSI target module is illustratively disposed between the FC and iSCSI drivers 228, 230 and the file system 265 to thereby provide a translation layer of the virtualization system 255 between the SAN block (lun) space and the file system space, where luns are to represented as vdisks. By "disposing" SAN virtualization over the file system 265, the multi-protocol storage appliance reverses the approaches taken by prior systems to thereby provide a single unified storage platform for essentially all storage access protocols.

The file system 265 is illustratively a message-based system; as such, the SCSI target module 260 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 260 passes the message into the file system 265 as, e.g., a function call, where the operation is performed.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the above-incorporated U.S. Pat. No. 5,819,292.

SAN clients typically identify and address disks by logical numbers or luns. However, the automated storage virtualization technique allows system administrators to manage vdisks and their addressing by logical names. To that end, the vdisk module 270 of the multi-protocol storage appliance maps logical names to vdisks. For example when creating a vdisk, the system administrator "right size" allocates the vdisk and assigns it a name that is generally meaningful to its intended application (e.g., /vol/vol0/database to hold a database).

The storage virtualization technique addresses the issue of performance limitations by defining a vdisk abstraction of a disk "on top of" the file system. This abstraction aggregates the bandwidth of the underlying disks by providing greater bandwidth for the vdisk than that obtainable by the concatenation of a smaller number of disk drives to needed solely to satisfy space requirements. Additionally, delayed allocation policies and write coalescing of the file system can serve to optimize the bandwidth of the vdisk compared to a pure physical implementation. As noted, layering of the vdisk on top of the file system also allows the vdisk to inherit the reliability configuration (e.g., RAID 4 and/or synchronous mirroring) of the underlying volume.

Included within the file system 265 is a set of processes, including HighPri 275, LowPri 280 and WALLOC 285 that perform various file system operations. HighPri and LowPri perform identical functions with the only difference being the priority level at which they run. These two basic file system processes (HighPri 275 and LowPri 280) perform the work of the file system layer, e.g., loading blocks into a buffer cache, setting dirty bits to the blocks and acquiring blocks to be cleaned and/or write allocated. The HighPri and LowPri processes are further described in U.S. patent application Ser. No. 10/027,634, entitled FILE SYSTEM DEFRAGMENTA- TION TECHNIQUE VIA WRITE ALLOCATION, John K. Edwards, et al., now issued as U.S. Pat. No. 6,978,283, on Dec. 20, 2005, the contents of which are hereby incorporated by reference as though fully set forth herein.

The WALLOC process 285, described further below, implements the novel system and method for managing file metadata during consistency points. In accordance with the illustrative embodiment of the present invention, the WALLOC process 285 performs all write allocation operations to ensure smooth consistency point data flow. Specifically, WALLOC creates and manages shadow metadata structures to ensure that the proper metadata is associated with both a current consistency point (CP) and with a next CP for each file.

C. Inodes and Buffer Trees

In the example of the illustrative WAFL file system, a file is represented as an inode data structure adapted for storage on disks. Broadly stated, the on-disk format representation of the exemplary WAFL file system is block based using, e.g., 4-kilobyte (KB) blocks and using inodes to describe the files. An inode is a data structure used to store information, such as metadata, about the file. That is, the information contained in an inode may include, e.g., ownership of the file, access permission for the file, size of the file, or other attributes, described further below. The WAFL file system uses a file handle, i.e., an identifier that includes an inode number, to retrieve an inode from disk. The exemplary WAFL file system also uses files to store metadata describing the layout of its file system. These metadata files include, among others, an inode file. The on-disk format structure of the WAFL file system, including inodes and the inode file, is disclosed and described in the above-incorporated U.S. Pat. No. 5,819,292.

Figure 3:
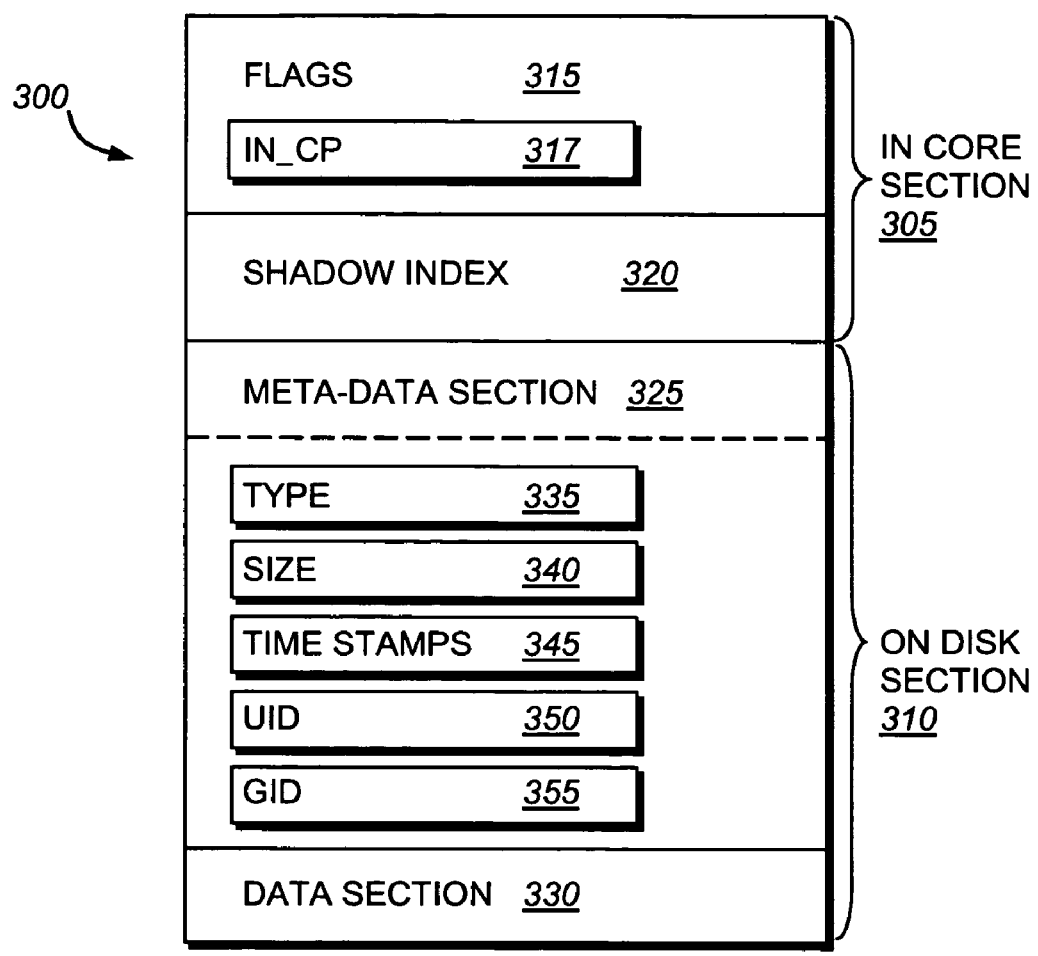
FIG. 3 is a schematic block diagram of exemplary inode data storage in accordance with an embodiment of the present invention.

FIG. 3 is a schematic block diagram illustrating an exemplary inode 300, which preferably includes an in-core section 305 and on-disk section 310. In accordance with the illustrative embodiment, both the in-core section 305 and the on-disk section 310 are stored in memory; however, only the on-disk section 310 is written to disk during a consistency point. The in-core section 305 comprises a flags section 315 and a shadow index 320. The flag section 315, in turn comprises a variety of flags including, for example, an IN_CP flag 317 that is set when the inode is actively modified during a CP write allocation phase. File system processes may, by examining the IN_CP flag, determine whether the inode is currently undergoing write allocation during a CP. The shadow index 320 is, in the illustrative embodiment, a two-byte value that serves as an index to a shadow data entry, described further below, which stores shadow or frozen state information when write operations are directed to an inode while it is being modified during a CP.

The on-disk section 310 illustratively includes a metadata section 325 and a data section 330. The information stored in the metadata section 325 of each inode 300 describes the file and, as such, includes the type (e.g., regular or directory) 335 of file, the size 340 of the file, time stamps (e.g., access and/or modification) 345 for the file and ownership, i.e., user identifier (UID 350) and group ID (GID 355), of the file. The contents of the data section 330 of each inode, however, may be interpreted differently depending upon the type of file (inode) defined within the type field 335. For example, the data section 330 of a directory inode contains metadata controlled by the file system, whereas the data section of a regular inode contains user-defined data. In this latter case, the data section 330 includes a representation of the data associated with the file.

Specifically, the data section 330 of a regular on-disk inode may include user data or pointers, the latter referencing 4 KB data blocks on disk used to store the user data. Each pointer is preferably a logical volume block number to thereby facilitate efficiency among the file system when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kilobytes (KB), then the data section of the inode comprises up to 16 pointers, each of which references a 4 KB block of data on the disk. Moreover, if the size of the data is greater than 64 kilobytes but less than or equal to 64 megabytes (MB), then each pointer in the data section 150 of the inode references an indirect inode that contains 1024 pointers, each of which references a 4 KB data block on disk. In addition, the size field 340 of the metadata section 330 of the inode refers to the size of the file.

Figure 4:
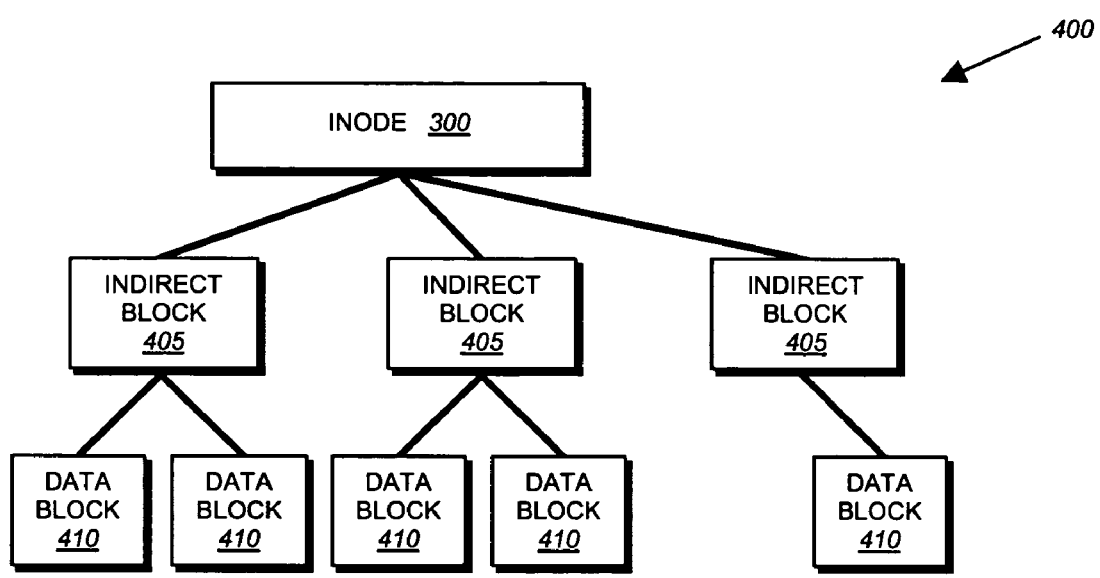
FIG. 4 is a schematic block diagram of an exemplary buffer tree and inode structure in accordance with an embodiment of the present invention.

An exemplary buffer tree 400 is shown in FIG. 4. Buffer trees are utilized by the file system to store data corresponding to a file. At the top of the buffer tree is an inode 300. The inode includes exemplary pointers to indirect blocks 405. Each indirect block includes, in turn, pointers to data blocks 410. During a write allocation procedure phase of a consistency point (CP), the write allocation process, which in the exemplary embodiment is the WALLOC process 285, determines which data blocks have been modified or dirtied and schedules write operations to store the newly modified data blocks on disk. Subsequently, any indirect blocks 405 are also written to disk with the appropriate pointers to the data blocks 410. In a later write operation phase of the CP, the inodes of files that have been write allocated during the CP are written to disk. At this point, the inode 300 is written to the inode file of the file system. The inode file is further described in U.S. patent application Ser. No. 10/217,119 entitled SYSTEM AND METHOD FOR TRACKING MODIFIED FILES IN A FILE SYSTEM, by Mark Muhlestein, et al., now issued as U.S. Pat. No. 6,983,296, the contents of which are hereby incorporated by reference.

D. Managing Metadata

Figure 5:
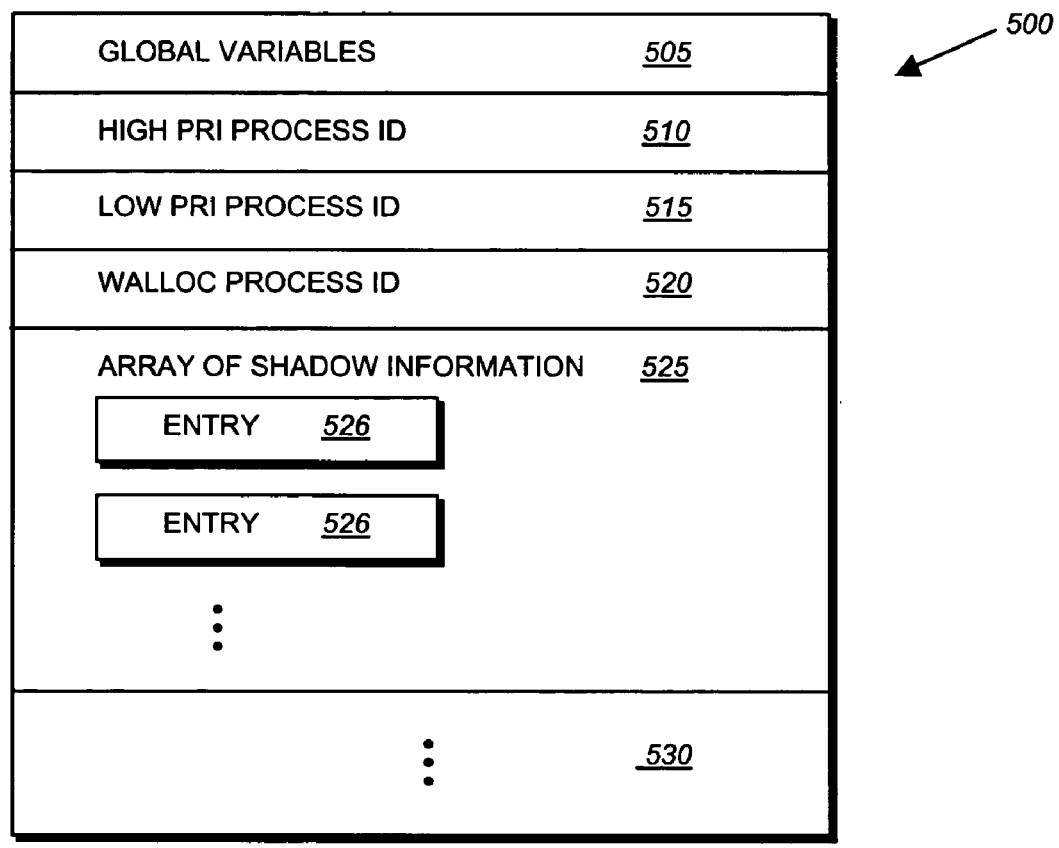
FIG. 5 is a schematic block diagram of an exemplary global file system data structure in accordance with an embodiment of the present invention.

A global state data structure 500 is maintained by the file system of the storage to operating system. FIG. 5 is a schematic block diagram of the global state data structure 500 including, in the illustrative embodiment, global variables 505, a process ID for a high priority (HighPri) process 510, the process ID for a low priority (LowPri) process 515, the process ID for the WALLOC process 520, an array of shadow information 525 and additional fields 530. The global variables 505 may include status flags and/or pointers to other data structures within the storage operating system. Each process ID 510, 515 and 520 contains a unique process identifier of the respective process executing within the storage operating system. The array of shadow information 525 comprises a plurality of entries 526, each configured to hold shadow data organized as shadow data structure 600 (see FIG. 6). As noted, the shadow data structures 600 store "shadow" state information pertaining to inodes that have been modified while they are in a CP in accordance with the teachings of the present invention. The array of shadow information 525 may be a reserved area of memory 124 configured to hold the shadow data structures or may, in alternative embodiments, contain a pointer to a group of such data structures.

FIG. 6 is a schematic block diagram of an exemplary shadow data structure 600 in accordance with an embodiment of the present invention. The shadow data structure 600 includes fields for permissions 605, file size, 610, number of blocks 615, time modified 620, time of changed attributes 625, a progress indicator 630 and flags 635. The permissions field 605 identifies the permissions associated with the file, e.g., whether it is read-only. The size field 610 identifies the size of the file in bytes, while the number of blocks field 615 identifies the number of blocks on disk that the file occupies. The time-modified field 620 identifies the last time that the file was modified by, for example, writing data to the file. The time attributes changed field 625 identifies the last time that the attributes associated with the file were changed. The progress indicator 630 is used by the WALLOC process, in the illustrative embodiment, to track the number of blocks that have been write allocated. Finally, the flags field 635 is used to store flags associated with the file and inode. In the illustrative embodiment, the flags field includes a DIRTY_IN_NEXT_CP flag that is used by the WALLOC process to identify that the incore inode is "dirty" for the next CP. By "dirty" it is meant that data has been written to the inode and therefore it must be write allocated during the next CP.

Figure 7:
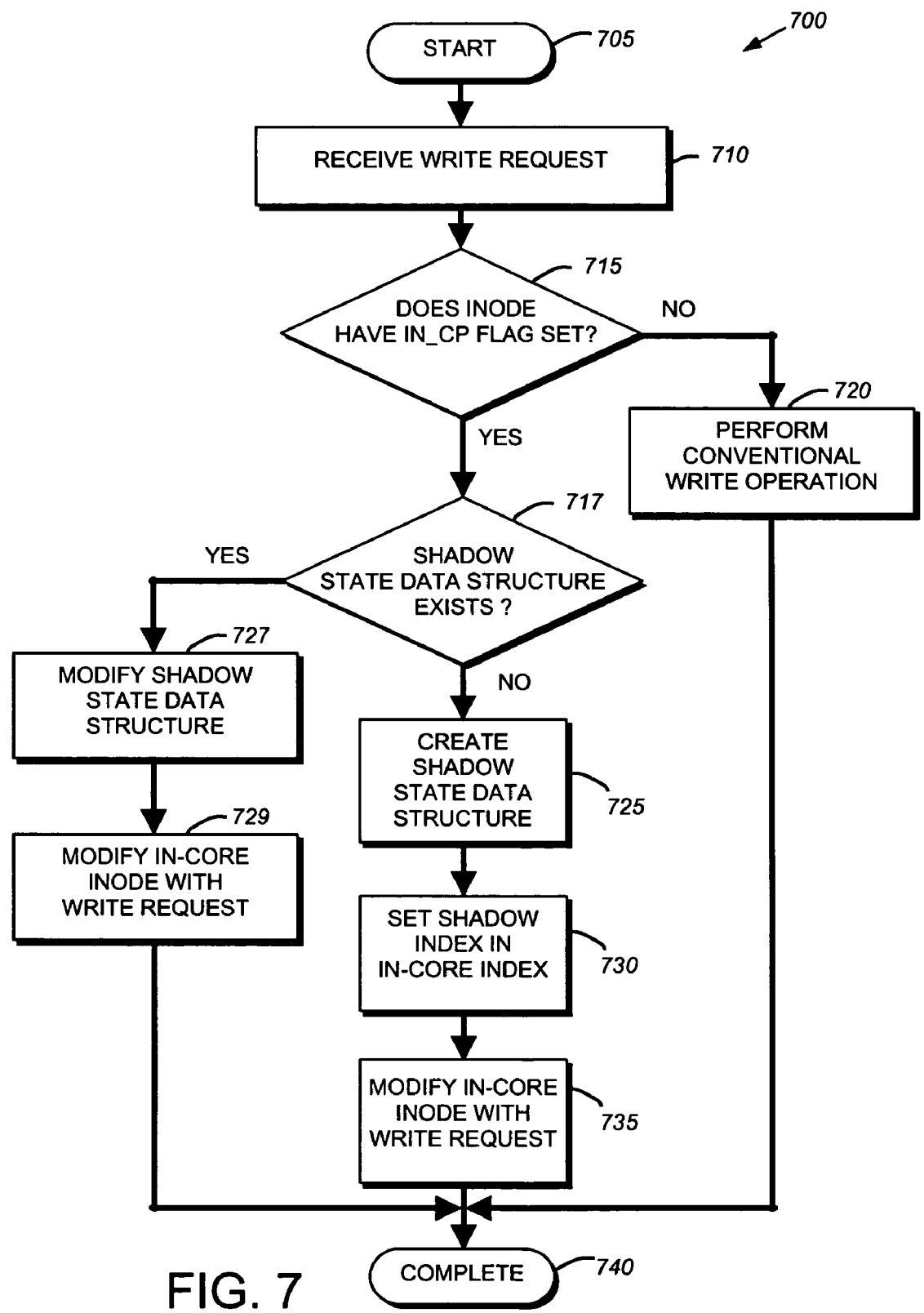
FIG. 7 is a flow chart detailing the steps of an exemplary procedure for creating shadow entries during a consistency point in accordance with an embodiment of the present invention.

FIG. 7 is a flow chart detailing the steps of a procedure 700 performed by file system 265 when processing write requests in accordance with an illustrative embodiment of the present invention. The procedure begins in step 705 and continues to step 710 where the file system receives a write request directed to a specified file. The file system, in step 715, determines if the inode associated with the file has the IN_CP flag set. This may be performed by checking the in-core inode of the file or, if the inode is not currently in core, loading the inode from disk. If the IN_CP flag is not set, the inode is not currently involved in a consistency point and the procedure branches to step 720 where a conventional write operation is performed. The procedure then ends (completes) at step 740.

If the IN_CP flag is set, the procedure then determines, in step 717, whether a shadow state data structure already exists for the inode. A shadow state data structure may already exist if, for example, the received write request is the second (or later) write request directed to the inode since it entered the IN_CP state. If a shadow state data structure already exists, the procedure branches to step 727 where the shadow state data structure is modified to incorporate the received write request changes. The in-core inode is then modified with the write request in step 729. Once the in-core inode has been modified, the procedure is then complete (step 740).

If no shadow state data structure exists in step 717, the procedure branches to step 725 where a shadow data structures 600 is created. The file system generates the shadow data structure, described above in reference to FIG. 6, by selecting a free entry 526 of the shadow array 525 in the global state data structure 500 and copying the contents of the appropriate fields from the in-core inode 300 to the shadow data structure entry. In step 730, the file system sets the shadow index 320 in the in-core inode 300 to an appropriate value that references the (now occupied) shadow entry 526 in the shadow information array of the global state data structure 500. The file system then modifies the in-core inode with any changes necessitated by the received write request in step 735. Once these changes have been written, the procedure completes in step 740. At this point in time, the most current metadata is stored in the in-core inode 300 and represents the metadata to be written to disk during the next CP. The metadata stored in the shadow entry 520 will be written to disk during write allocation of the current CP.

Figure 8:
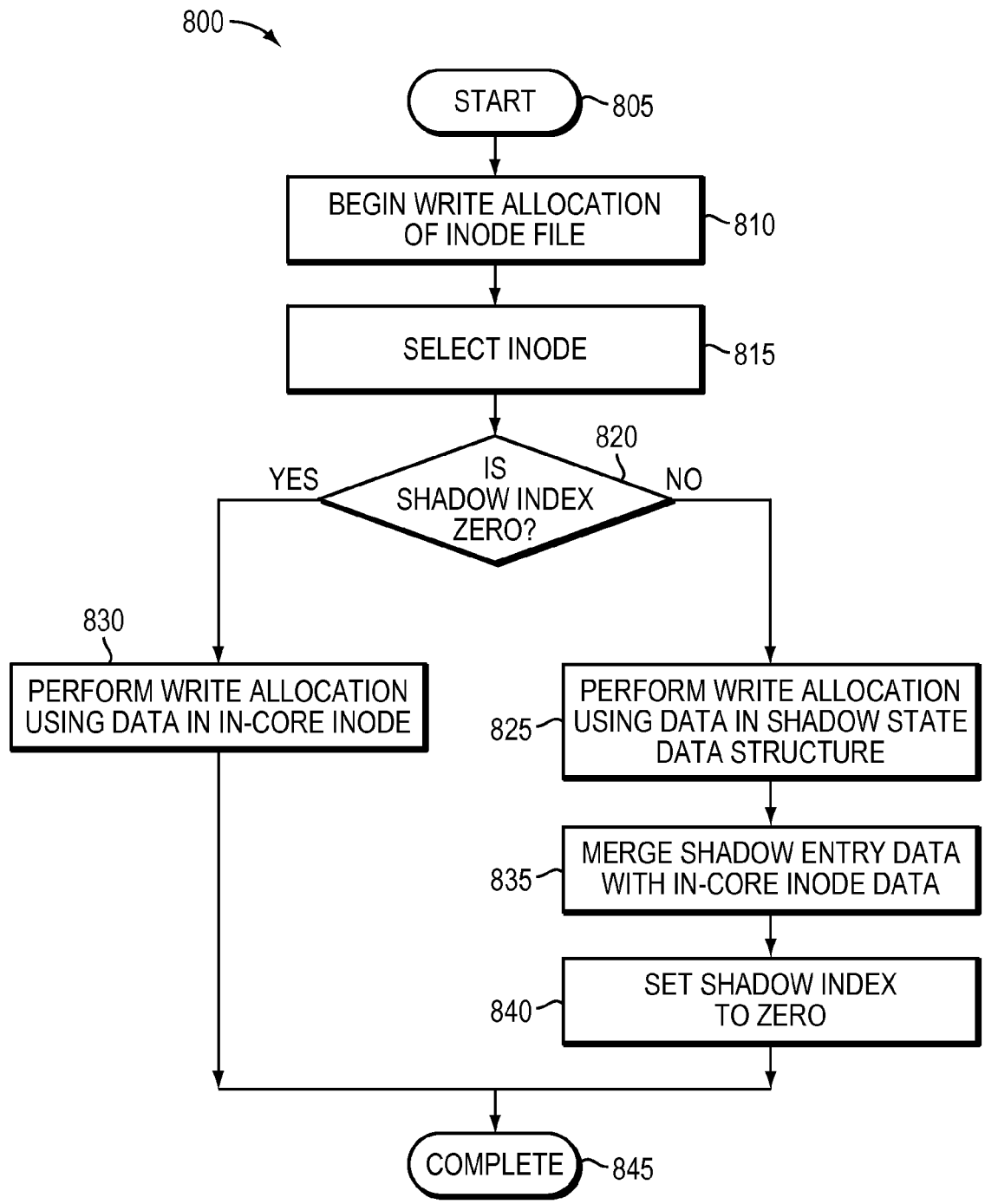
FIG. 8 is a flow chart detailing the steps of an exemplary procedure for merging shadow entry data with in core inode data during write allocation in accordance with an embodiment of the present invention.

FIG. 8 is a flow chart detailing the steps of an exemplary procedure 800 performed by the file system during inode write allocation. The procedure begins in step 805 and continues to step 810 where write allocation of the inode file begins. The write allocation of the inode for the file begins after the file's buffer tree 400 has been write allocated and certain metadata (e.g., the number of blocks) is known. In step 815, the file system, selects an inode to be write allocated and, in step 820, determines if the shadow index 320 within the in-core inode 300 has a value of zero.

If the shadow index is not zero, then the procedure branches to step 825 and performs write allocation using the data in the shadow entry. The procedure then continues to step 835 where the shadow entry data is merged with the in-core inode data by, for example, copying the in-core inode 300 to a write buffer (not shown) and then copying the shadow entry data to overwrite certain fields with the shadow data. Once the shadow entry data has been merged with the in-core inode data, the file system then sets the shadow index 320 of the inode 300 to zero in step 840. At this point, the in-core inode 300 contains the appropriate data for the next consistency point. The procedure then completes (step 845).

However, if the shadow index has a zero value, the procedure branches to step 830 and performs the write allocation using the data contained in the in-core inode. The procedure thereafter completes in step 845.

To again summarize, the present invention provides a system and method for managing metadata during consistency points thereby enabling a file system to accept and store write operations directed to a file while the file is undergoing write allocation. When a write operation is received for a file, the file system determines if the file is currently involved in a CP. If the file is not involved with a CP, the file system performs a conventional write operation. However, if the file is currently in a CP, the file system copies the appropriate metadata from the in-core inode structure to a shadow state data structure. The in-core inode structure is then modified with the appropriate metadata associated with the write operation. Additionally, an index value is set in the in-core inode data structure to point to the appropriate shadow entry data structure.

During write allocation of the inode, the file system write allocation process 285 (WALLOC) detects the value of the shadow index 320 within the in-core inode data structure 300. If the index value is zero, then the inode has not been modified during a CP and the write allocator process performs a conventional write allocation. However, if the index value is non-zero, then the file has been modified during a CP and a shadow state data structure 600 exists. In such a case, the write allocation process 285 utilizes the shadow state data entry data structure 600 when writing the inode for the file to disk for the current CP, while maintaining the in-core inode data structure metadata for use in the next CP.

The foregoing has been a detailed description of the illustrative embodiment of the present invention. There are modifications and additions can be made without departing from the spirit and scope of the invention. Additionally, while this description has been written with reference to storage appliances and file servers, the principles are equally pertinent to all types of computers. Furthermore, it is expressly contemplated that the teachings of this invention can be implemented as software, including a computer-readable media having program instructions executing on a computer, hardware, firmware, or a combination thereof. Accordingly this description is to be taken only by way of example and not to otherwise limit the scope of the invention.

What is claimed is:

1. A computer method for enabling write operations to data undergoing write allocation in a computer storage system, comprising:

receiving a write request operation directed to the data while writing a current consistency point of the data;

determining by a processor of the computer storage system, in response to the data undergoing writing of the current consistency point, that an inode of the data does not have a shadow entry associated therewith;

creating, in response to determining that the inode of the data does not have the shadow entry associated therewith, the shadow entry of a global data structure in a memory of the computer storage system, the shadow entry configured to store metadata associated with the inode of the data;

copying the metadata from the inode of the data to the shadow entry;

updating the inode of the data to reference metadata associated with the write request;

committing the metadata copied in the shadow entry to the current consistency point; and committing the metadata associated with the write request and referenced by the inode of the data to the computer storage system during a next consistency point.

2. The method of claim 1 further comprising:
setting a shadow index in the inode to reference the shadow entry of the global data structure.

3. The method of claim 2 further comprising:
modifying the inode of the data according to the received write request operation prior to write allocation beginning on the data.

4. The method of claim 1 further comprising:
checking a flag in the inode associated with the data to determine if the data is currently undergoing write allocation.

5. The method of claim 1 further comprising:
identifying a free shadow entry of the global data structure; and
organizing a set of metadata from the inode associated with the data as a shadow data structure of the identified free shadow entry.

6. The method of claim 5 further comprising:
setting a value of a shadow index in the inode of the data, the shadow index value identifying the identified shadow data structure entry.

7. The method of claim 1 further comprising:
modifying the inode of the data with metadata associated with the received write request operation after write allocation is completed on the data.

8. The method of claim 6 further comprising:
setting the shadow index value in the inode to zero at the completion of a write allocation process.

9. The method of claim 1 further comprising:
determining that the inode of the data does have the shadow entry associated therewith; and
modifying, in response to determining that the inode of the file has the shadow entry associated therewith, the shadow entry according to the received write request operation.

10. A computer storage system configured to enable write operations to data undergoing write allocation, comprising:
a network adaptor of the computer storage system configured to receive a write request operation directed to the data while writing a current consistency point of the data;
means for determining by a processor of the computer storage system that the data is currently undergoing write allocation;

means for determining, in response to the data undergoing writing of the current consistency point, that the data is not associated with a shadow entry of metadata;

means for creating, in response to the data not being associated with the shadow entry of metadata, the shadow entry of metadata associated with an inode of the data;

means for copying the metadata from the inode of the data to the shadow entry;

means for updating the inode of the data to reference metadata associated with the write request;

means for committing the metadata copied in the shadow entry to the current consistency point; and means for committing the metadata associated with the write request and referenced by the inode of the data to the computer storage system during a next consistency point.

11. The computer storage system of claim 10 further comprising means for setting a shadow index in an in-core inode, the shadow index pointing to the shadow entry of metadata associated with the inode of the data.

12. The computer storage system of claim 10 further comprising means for modifying the inode according to the received write request operation prior to write allocation beginning on the data or after write allocation is completed on the data.

13. The computer storage system of claim 10 wherein the means for determining the data is currently undergoing write allocation further comprises means for checking a flag in the inode associated with the data.

14. The computer storage system of claim 10 further comprising:
means for identifying a free shadow state entry data structure: and
means for copying a set of metadata from the inode associated with the data to the identified free shadow state entry data structure.

15. A computer method for enabling write operations to data, comprising:
executing, by a processor, a write allocation to write a consistency point of an inode associated with the data;
selecting an inode associated with the data;
determining whether a shadow index of a shadow entry data structure has a value of zero;
in response to determining that the shadow index has the value of zero, performing write allocation for the inode using in-core inode data; and
in response to determining that the shadow index does not have the value of zero, performing write allocation for the inode using data in the shadow entry data structure and merging the data of the shadow entry data structure with the in-core inode data.

16. The method of claim 15 further comprising:
setting the shadow index in the in-core inode to zero after performing the write allocation for the inode using the data in the shadow entry data structure and merging the data of the shadow entry data structure with the in-core inode data.

17. The method of claim 15 further comprising:
copying the in-core inode data to a buffer;
identifying the shadow entry data structure; and
copying the identified shadow entry data from the identified shadow entry data structure onto the buffer.

18. The method of claim 17 further comprising:
locating, using the shadow index in the inode, the shadow entry data structure.

19. A computer readable storage medium containing executable program instructions executed by a processor, comprising:
- program instructions that initiate write allocation of data associated with a current consistency point at a selected time;
- program instructions that receive a write request directed to the data during write allocation of the current consistency point of the data;
- program instructions that determine that the data is undergoing write allocation;
- program instructions that create a shadow entry of metadata associated with an inode of the data, in response to the data currently undergoing write allocation;
- program instructions that copy the metadata from the inode of the data to the shadow entry;
- program instructions that update the inode of the data to reference metadata associated with the write request;
- program instructions that commit the metadata copied in the shadow entry to the current consistency point; and
- program instructions that commit the metadata associated with the write request and referenced by the inode of the data to a computer storage system during a next consistency point.

20. The computer readable storage medium of claim 19 further comprising:
- program instructions that identify a free shadow state entry data structure; and
- program instructions that copy the metadata associated with the inode of the data to the identified free shadow state entry data structure.

21. A computer storage system configured to enable write operations to data undergoing write allocation, comprising:
- a network adapter configured to receive a write operation directed to the data while writing a current consistency point of the data;
- a write allocation process executed by a processor of the computer storage system configured to create, in response to no shadow state data structure associated with an inode of the data undergoing writing of the consistency point, a shadow state data structure associated with the inode of the data in response to a receipt of the write operation directed to the data while the data is undergoing write allocation;
- the write allocation process further configured to modify an existing shadow state data structure in accordance with the received write operation, the shadow state data structure referencing metadata from the inode of the data;
- the write allocation process further configured to update the inode of the data to reference metadata associated with the write request;
- the write allocation process further configured to commit the metadata in the shadow entry to the current consistency point; and
- a second write allocation process configured to commit the metadata associated with the write request and referenced by the inode of the data to the computer storage system during a next consistency point.

22. A computer method for enabling processing of write operations to data undergoing write allocation in a computer storage system without suspending the write operation, comprising:
- receiving a write request directed to the data during write allocation of a current consistency point of the data;
- creating a global state data structure;
- storing in a memory of the computer storage system, in response to a write request, shadow data in the created global state data structure during write allocation of an inode associated with the data, wherein the shadow data is metadata from the inode of the data;
- updating the inode of the data to reference metadata associated with the write request;
- committing the metadata stored in the global state data structure to the current consistency point; and
- committing the metadata associated with the write request and referenced by the inode of the data to the computer storage system during a next consistency point.

23. The method of claim 22 wherein the shadow data comprises one or more global variables.

24. The method of claim 23 wherein the one or more global variables comprise one or more status flags.

25. The method of claim 24 wherein one of the status flags indicates the data is currently undergoing write allocation.

26. The method of claim 23 wherein the one or more global variables comprise one or more pointers.

27. The method of claim 26 wherein one of the pointers indicates a location of a shadow data structure.

28. The method of claim 23 wherein the one or more global variables comprise an array of shadow information.

29. The method of claim 28 wherein the array of shadow information comprises a plurality of entries.

30. The method of claim 29 wherein each entry comprises a shadow data structure.

31. The method of claim 30 further comprising:
- storing shadow state information in the shadow data structure.

32. The method of claim 31 wherein the shadow state information comprises information pertaining to inodes that have been modified during a consistency point.

33. The method of claim 31 wherein the shadow state information comprises one or more shadow data structures.

34. The method of claim 33 wherein the shadow data structures comprise pointers to one or more groups of data structures.

35. A computer storage system for enabling processing of write operations to data undergoing write allocation, comprising:
- means for receiving a write request directed to the data during write allocation of a current consistency point of the data;
- a processor configured to create a global state data structure in memory of the computer storage system;
- means for storing, in response to the write request, shadow data in the created global state data structure during write allocation of an inode associated with the data, wherein the shadow data is metadata from the inode of the data;
- means for updating the inode of the data to reference metadata associated with the write request;
- means for committing the metadata stored in the global state data structure to the current consistency point; and
- means for committing the metadata associated with the write request and referenced by the inode of the data to the computer storage system during a next consistency point.

36. The computer storage system of claim 35 wherein the shadow data comprises one or more global variables.

37. The computer storage system of claim 36 wherein the one or more global variables comprise one or more status flags.

38. The computer storage system of claim 35 further comprising means for indicating the data is currently undergoing write allocation.

39. The computer storage system of claim 36 wherein the one or more global variables comprise one or more pointers.

40. The computer storage system of claim 39 wherein one of the pointers act as means for indicating a location of the shadow data structure.

41. The computer storage system of claim 36 wherein the one or more global variables comprise an array of shadow information.

42. The computer storage system of claim 41 wherein the array of shadow information comprises means for storing a plurality of entries.

43. The computer storage system of claim 42 wherein each entry comprises a shadow data structure.

44. The computer storage system of claim 43 further comprising means for storing shadow state information in the shadow data structure.

45. The computer storage system of claim 44 wherein the shadow state comprises information pertaining to inodes that have been modified during a consistency point.

46. The computer storage system of claim 44 wherein the shadow state information comprises the shadow data structures.

47. The computer storage system of claim 46 wherein the shadow data structure comprises pointers to one or more groups of data structures.

48. A computer method for enabling write operations to data undergoing write allocation in a computer storage system, comprising:
  performing, by a processor of the computer storage system, the write allocation on the data, wherein the write allocation writes to memory stored in an inode of the data;
  receiving a write request operation directed to the data while writing a current consistency point of the data;
  creating a shadow entry of a global data structure in a second memory of the computer storage system, the shadow entry configured to store metadata associated with the inode of the data;
  copying metadata from the inode of the data to the shadow entry;
  storing, during write allocation of the inode associated with the data, metadata associated with the write request to the inode of the data; and
  committing the metadata copied in the shadow entry to the current consistency point; and
  committing the metadata associated with the write request and referenced by the inode of the data to the computer storage system during a next consistency point.

49. The method of claim 48, further comprising:
  setting a shadow index in the inode to reference the shadow entry of the global data structure.

50. The method of claim 48, further comprising:
  modifying the inode according to the received write request operation prior to write allocation beginning on the data or after write allocation is completed on the data.

51. The method of claim 48, further comprising:
  checking a flag in the inode associated with the data to determine if the data is currently undergoing write allocation.

52. The method of claim 48, further comprising:
  identifying a free shadow entry of the global data structure; and
  organizing a set of metadata from the inode associated with the data as a shadow data structure of the identified free shadow entry.

53. The method of claim 52, further comprising:
  setting a value of a shadow index in the inode of the data, the index value identifying the identified shadow data structure entry.

54. The method of claim 53, further comprising:
  setting the index value in the inode to zero at a completion of the write allocation process.

55. A computer storage system configured to enable write operations to data undergoing write allocation, comprising:
  a network adapter configured to receive a write request directed to the data during write allocation of a current consistency point of the data;
  a write allocation process executed by a processor configured to create a shadow state data structure associated with the inode of the data upon receipt of the write request directed to the data while the data is undergoing the write allocation, the write allocation process further configured to modify a shadow state data structure in accordance with the received write request;
  the write allocation process further configured to copy metadata from the inode of the data to the shadow state data structure;
  the write allocation process further configured to update the inode of the data to reference metadata associated with the write request;
  the write allocation process further configured to commit the metadata copied in the shadow state data structure to the current consistency point; and
  a second write allocation process configured to commit the metadata associated with the write request and referenced by the inode of the data to the computer storage system during a next consistency point.

* * * * *

UNITED STATES PATENT AND TRADEMARK OFFICE
CERTIFICATE OF CORRECTION

PATENT NO.       : 7,783,611 B1                                                     Page 1 of 1
APPLICATION NO.  : 10/705025
DATED            : August 24, 2010
INVENTOR(S)      : Eric Hamilton It is certified that error appears in the above-identified patent and that said Letters Patent is hereby corrected as shown below:

Col. 1, Line 17, please amend as shown:

area network (SAN)[[ to]] or a network attached storage (NAS)

Col. 1, Line 50, please amend as shown:

packets) to the file system over the[[ to]] network identifying one

Col. 5, Line 44, please amend as shown:

embodied as a storage[[ to]] system comprising a processor 122,

Col. 6, Line 60, please amend as shown:

channel network processing operations for the[[ to]] storage

Col. 10, Line 7, please amend as shown:

block (lun) space and the file system space, where luns are[[ to]]

Col. 10, Line 49, please amend as shown:

enation of a smaller number of disk drives[[ to]] needed solely to

Col. 12, Line 44, please amend as shown:

system of the storage[[ to]] operating system. FIG.5 is a sche-

Col. 19, Line 46, please amend as shown:

the inode of the data;[[ and]]

Signed and Sealed this

Second Day of November, 2010

David J. Kappos
*Director of the United States Patent and Trademark Office*